US011939453B2

(12) United States Patent
Kim et al.

(10) Patent No.: US 11,939,453 B2
(45) Date of Patent: Mar. 26, 2024

(54) PLASTICIZER COMPOSITION AND RESIN COMPOSITION COMPRISING THE SAME

(71) Applicant: LG CHEM, LTD., Seoul (KR)

(72) Inventors: Hyun Kyu Kim, Daejeon (KR); Seok Ho Jeong, Daejeon (KR); Jeong Ju Moon, Daejeon (KR); Woo Hyuk Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 182 days.

(21) Appl. No.: 17/602,673

(22) PCT Filed: Jun. 11, 2020

(86) PCT No.: PCT/KR2020/007550
§ 371 (c)(1),
(2) Date: Oct. 8, 2021

(87) PCT Pub. No.: WO2020/251266
PCT Pub. Date: Dec. 17, 2020

(65) Prior Publication Data
US 2022/0177672 A1 Jun. 9, 2022

(30) Foreign Application Priority Data
Jun. 12, 2019 (KR) .......................... 10-2019-0069411

(51) Int. Cl.
*C08K 5/11* (2006.01)
*C08K 5/1515* (2006.01)

(52) U.S. Cl.
CPC .............. *C08K 5/11* (2013.01); *C08K 5/1515* (2013.01)

(58) Field of Classification Search
CPC ................................ C08K 5/11; C08K 5/1515
See application file for complete search history.

(56) References Cited

U.S. PATENT DOCUMENTS

| 2007/0287781 | A1 | 12/2007 | Grass et al. |
| 2014/0235769 | A1 | 8/2014 | Kim et al. |
| 2014/0309345 | A1 | 10/2014 | Frenkel et al. |
| 2015/0126624 | A1 | 5/2015 | Baseeth |
| 2017/0081501 | A1 | 3/2017 | Kim et al. |
| 2017/0369656 | A1* | 12/2017 | Kim .............................. C08J 3/18 |
| 2018/0112062 | A1 | 4/2018 | Kim et al. |
| 2018/0291178 | A1 | 10/2018 | Kim et al. |
| 2019/0211183 | A1 | 7/2019 | Kim et al. |
| 2020/0270196 | A1* | 8/2020 | Kim ...................... C07C 69/704 |
| 2021/0070964 | A1 | 3/2021 | Kim et al. |
| 2022/0251336 | A1 | 8/2022 | Kim et al. |

FOREIGN PATENT DOCUMENTS

| CN | 103113617 | A | | 5/2013 | |
| CN | 105295102 | A | | 2/2016 | |
| CN | 107108961 | A | | 8/2017 | |
| CN | 107337874 | A | * | 11/2017 | ............. C08L 27/06 |
| CN | 107531937 | A | | 1/2018 | |
| CN | 108350216 | A | | 7/2018 | |
| JP | S61-051044 | A | | 3/1986 | |
| JP | 2007-326859 | A | | 12/2007 | |
| JP | 2014-528513 | A | | 10/2014 | |
| KR | 10-0957134 | B | | 5/2010 | |
| KR | 10-0965618 | B | | 6/2010 | |
| KR | 10-2014-0070566 | A | | 6/2014 | |
| KR | 10-2015-0024837 | A | | 3/2015 | |
| KR | 10-2016-0099453 | A | | 8/2016 | |
| KR | 10-2016-0130363 | A | | 11/2016 | |
| KR | 10-2017-0049446 | A | | 5/2017 | |
| KR | 10-1837123 | B | | 3/2018 | |
| KR | 10-2018-0039305 | A | | 4/2018 | |
| KR | 10-1899656 | B | | 9/2018 | |
| KR | 10-2018-0129153 | A | | 12/2018 | |
| KR | 10-1952338 | B | | 2/2019 | |
| WO | 2018/216985 | A1 | | 11/2018 | |
| WO | WO2018216985 | | * | 11/2018 | ............. C08K 5/101 |

OTHER PUBLICATIONS

Hosney et al., Epoxidized vegetable oil and bio-based materials as PVC plasticizer, J. Appl. Polym. Sci. 2018, DOI:10.1.002/APP. 46270 (Year: 2018).*
CN107337874A English translation (Year: 2017).*

* cited by examiner

*Primary Examiner* — Arrie L Reuther
*Assistant Examiner* — Huihong Qiao
(74) *Attorney, Agent, or Firm* — Bryan Cave Leighton Paisner LLP

(57) ABSTRACT

A plasticizer composition including a citrate-based material and an epoxidized oil, and the plasticizer composition capable of maintaining an excellent plasticization efficiency and providing an improved mechanical properties and stress resistance when compared with conventional phthalate-based plasticizer products.

9 Claims, No Drawings

PLASTICIZER COMPOSITION AND RESIN COMPOSITION COMPRISING THE SAME

CROSS-REFERENCE TO RELATED APPLICATIONS

The present application is a National Stage Application of International Application No. PCT/KR2020/007550, filed on Jun. 11, 2020, which claims priority to Korean Patent Application No. 10-2019-0069411, filed on Jun. 12, 2019, the disclosures of which are incorporated herein by reference in their entireties.

TECHNICAL FIELD

The present disclosure relates to a plasticizer composition and a resin composition including the same, and relates to a plasticizer composition which is eco-friendly and has excellent physical properties, and a resin composition including the same.

BACKGROUND

Generally, plasticizers are obtained through the reaction of alcohols with polycarboxylic acids such as phthalic acid and adipic acid to form corresponding esters. In addition, considering the internal and external regulations on harmful phthalate-based plasticizers to the human body, studies are being continued on plasticizer compositions which may replace phthalate-based plasticizers such as terephthalate-based, adipate-based and other polymer-based plasticizers.

Meanwhile, regardless of the type of industry including plastisol type of industry of flooring materials, wallpaper, soft and hard sheets, etc., calendaring type of industry, extrusion/injection compound type of industry, the demand for eco-friendly products is increasing. In order to reinforce the quality properties, processability and productivity by the finished products, an appropriate plasticizer is required considering discoloration, migration, mechanical properties, etc.

According to the properties required by the types of industry in various areas of usage, such as tensile strength, elongation rate, light resistance, migration, gelling properties and absorption rate, supplementary materials such as a plasticizer, a filler, a stabilizer, a viscosity decreasing agent, a dispersant, a defoaming agent and a foaming agent are mixed with a PVC resin.

For example, in case of applying di(2-ethylhexyl) terephthalate (DEHTP) which is relatively cheap and widely used among plasticizer compositions which may be applied to PVC, hardness or sol viscosity is high, absorption rate of a plasticizer is relatively slow, and migration and stress migration are not good.

As improvements on the above limitations, the application of a transesterification product with butanol as a plasticizer, as a composition including DEHTP may be considered. In this case, plasticization efficiency is improved but volatile loss or thermal stability is inferior and mechanical properties are somewhat degraded, and the improvement of physical properties is required. Accordingly, in general, there is no solution but employing a method compensating the defects through mixing with a second plasticizer at the present time.

However, in case of applying the second plasticizer, there are drawbacks of generating unexpected problems as follows: the change of the physical properties is hard to predict, the application may become a factor of increasing the unit price of the product, the improvement of the physical properties is not clearly shown except for specific cases, and problems relating to compatibility with a resin may arise.

In addition, if a material like tri(2-ethylhexyl) trimellitate or triisononyl trimellitate is applied as a trimellitate-based product in order to improve the inferior migration and loss properties of the DEHTP products, migration or loss properties may be improved, but plasticization efficiency may be degraded, and a great deal of the material is required to be injected to provide a resin with suitable plasticization effect. Accordingly, considering relatively high unit price of the trimellitate-based products, commercialization thereof is impossible.

Further, in order to improve the inferior performance of DEHTP products, the hydrogenated products thereof have been suggested, but the products thus obtained show improved plasticization efficiency but degraded mechanical properties and stress resistance and further deteriorated migration and loss properties, and the issue on the increase of the unit price due to hydrogenation remains.

Accordingly, the development of products for solving the environmental issues of the conventional phthalate-based products or products for improving inferior physical properties of the eco-friendly products for improving the environmental issues of the phthalate-based products is required.

RELATED ARTS (Patent Document 1) KR10-0957134B

SUMMARY

Technical Problem

An object of the present disclosure is to provide a plasticizer composition which is eco-friendly and has excellent physical properties, and a plasticizer composition having substantially improved mechanical properties and volatile loss properties by restrictively controlling the carbon number of a citrate-based material and the mixing ratio with an epoxidized oil.

Technical Solution

To solve the problems above, the presentdisclosure provides a plasticizer composition including: a citrate-based material in which alkyl groups of three ester groups are each independently selected from alkyl groups of 5 to 7 carbon atoms; and an epoxidized oil, wherein a weight ratio of the citrate-based material to the epoxidized oil is 95:5 to 50:50.

In order to solve the problems above, the present disclosure provides a resin composition including 100 parts by weight of a resin and 5 to 150 parts by weight of the plasticizer composition.

ADVANTAGEOUS EFFECTS

The plasticizer composition of the present disclosure is eco-friendly, and may substantially improve physical properties such as tensile strength, elongation rate, migration, volatile loss and stress resistance to equal to or better levels than those obtained by common phthalate products or improved products thereof, when included in a resin composition.

Particularly, plasticization efficiency can be maintained at an excellent level, and volatile loss and mechanical properties may be improved at the same time.

MODE FOR CARRYING OUT THE DISCLOSURE

Hereinafter, the present disclosure will be explained in more detail to assist the understanding of the present disclosure.

Definition of Terms

The term "composition" as used in the present disclosure includes a mixture of materials including the corresponding composition as well as a reaction product and a decomposition product formed from the materials of the corresponding composition.

The prefix "iso-" as used in the present disclosure means an alkyl group in which a methyl group or an ethyl group is combined as a branched chain with the main chain of the alkyl group, and "isoalkyl group (for example, an isopentyl group, an isohexyl group or isoheptyl group)" may mean a mixture of branched alkyl groups which are structural isomers with the same carbon number.

The term "straight vinyl chloride polymer" as used in the present disclosure may be one type of vinyl chloride polymers and polymerized by suspension polymerization, bulk polymerization, etc., and may refer to a polymer having a porous particle shape in which a large number of pores having a size of tens to hundreds of micrometers are dispersed, and having no cohesiveness and excellent flowability.

The term "paste vinyl chloride polymer" as used in the present disclosure may be one type of vinyl chloride polymers and polymerized by microsuspension polymerization, microseed polymerization, emulsion polymerization, etc., and may refer to a polymer having minute particles without pores and a size of tens to thousands of nanometers, cohesiveness, and inferior flowability.

The terms "comprising", and "having" and the derivatives thereof in the present invention, though these terms are particularly disclosed or not, do not intended to preclude the presence of optional additional components, steps, or processes. In order to avoid any uncertainty, all compositions claimed by using the term "comprising" may include optional additional additives, auxiliaries, or compounds, including a polymer or any other materials, unless otherwise described to the contrary. In contrast, the term "consisting essentially of ~" excludes unnecessary ones for operation and precludes optional other components, steps or processes from the scope of optional continuous description. The term "consisting of ~" precludes optional components, steps or processes, which are not particularly described or illustrated.

Measurement Methods

In the present disclosure, the content analysis of the components in a composition which is a product of specific reaction, for example, esterification reaction, is conducted by gas chromatography measurement using a gas chromatography equipment of Agilent Co. (product name: Agilent 7890 GC, column: HP-5, carrier gas: helium (flow rate of 2.4 ml/min), detector: F.I.D., injection volume: 1 μl, initial value: 70° C./4.2 min, end value: 280° C./7.8 min, program rate: 15° C./min).

In the present disclosure, "hardness" means Shore hardness (Shore "A" and/or Shore "D") at 25° C. and is measured in conditions of 3T 10 s using ASTM D2240. The hardness may be an index for evaluating plasticization efficiency, and the lower the value is, the better the plasticization efficiency is.

In the present disclosure, "tensile strength" is obtained according to an ASTM D638 method by drawing a specimen in a cross head speed of 200 mm/min (1T) using a test apparatus of U.T.M (manufacturer: Instron, model name: 4466), measuring a point where the specimen is cut, and calculating according to the following Mathematical Formula 1:

Tensile strength (kgf/cm$^2$)=load value (kgf)/(thickness (cm)×width (cm))    [Mathematical Formula 1]

In the present disclosure, "elongation rate" is obtained according to an ASTM D638 method by drawing a specimen in a cross head speed of 200 mm/min (1T) using the U.T.M, measuring a point where the specimen is cut, and calculating according to the following Mathematical Formula 2:

Elongation rate (%)=(length after elongation/initial length)×100    [Mathematical Formula 2]

In the present disclosure, "migration loss" is obtained according to KSM-3156, by which a specimen with a thickness of 2 mm or more is obtained, glass plates are attached onto both sides of the specimen and a load of 1 kgf/cm$^2$ is applied. The specimen is stood in a hot air circulation type oven (80° C.) for 72 hours, then taken out therefrom and cooled at room temperature for 4 hours. Then, the glass plates attached onto both sides of the specimen are removed, the weights before and after standing in the oven are measured, and the migration loss is calculated according to Mathematical Formula 3 below. Here, the material of the plate may be diverse such as polystyrene (PS), ABS, glass and specimen plate itself, and the material of the plate used for the measurement in the present disclosure is glass.

Migration loss (%)={(initial weight of specimen at room temperature−weight of specimen after standing in oven)/initial weight of specimen at room temperature}×100    [Mathematical Formula 3]

In the present disclosure, "volatile loss" is obtained by processing a specimen at 80° C. for 72 hours and then, measuring the weight of the specimen.

Volatile loss (wt %)={(initial weight of specimen−weight of specimen after processing)/initial weight of specimen}×100    [Mathematical Formula 4]

In case of the various measurement conditions, the details of the conditions of the temperature, the speed of revolution, the time, etc., may be somewhat changed according to situations, and if the conditions are different, a measurement method and its conditions are required to be separately indicated.

Hereinafter, the present disclosure will be explained in more detail to assist the understanding of the presentdisclosure.

It will be understood that terms or words used in the present disclosure and claims should not be interpreted as having a meaning that is defined in common or in dictionaries, however should be interpreted in consistent with the technical scope of the present disclosure based on the principle that inventors may appropriately define the concept of the terms to explain the invention at his best method.

The plasticizer composition according to an embodiment includes a citrate-based material and an epoxidized oil, wherein in the citrate-based material, alkyl groups of three ester groups are each independently selected from alkyl groups of 5 to 7 carbon atoms, and a weight ratio of the two components is 95:5 to 50:50.

According to an embodiment of the presentdisclosure, the citrate-based material includes alkyl groups of 5 to 7 carbon atoms bonded thereto, and the alkyl group may be, for example, an n-pentyl group, an isopentyl group, an n-hexyl group, an isohexyl group, an n-heptyl group, or an isoheptyl group, and preferably, an n-pentyl group, an isopentyl group, an n-hexyl group or an isohexyl group may be applied.

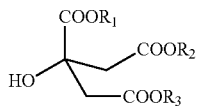

[Formula 1]

In Formula 1, $R_1$ to $R_3$ may be each independently the same or different from each other, and may be an alkyl group of 5 to 7 carbon atoms.

The citrate in which $R_1$ to $R_3$ are alkyl groups of 5 to 7 carbon atoms, and the alkyl groups are different from one another, may be referred to as a hybrid citrate. For example, the citrate may be a material in which two different alkyl groups selected from the aforementioned substituent group are combined, including a citrate having combined substituents of an n-pentyl group and an n-heptyl group, a citrate having combined substituents of an n-pentyl group and an isopentyl group, a citrate having combined substituents of an isopentyl group and an n-hexyl group, etc.

The citrate-based material in which $R_1$ to $R_3$ are the same may be referred to as a nonhybrid citrate, and for example, tri(n-pentyl) citrate, triisopentyl citrate, tri(n-hexyl) citrate, triisohexyl citrate, tri(n-heptyl) citrate or triisoheptyl citrate may be applied.

If a citrate compound in which the carbon number of the alkyl group is less than 5 is used, the addition effects of the citrate-based material may not be shown due to volatility, and migration properties or loss properties such as volatile loss may be deteriorated due to volatilization. Further, the deterioration of mechanical properties might become a serious level, and such change may be definitely expressed from the carbon number of 5.

In addition, if the carbon number of the alkyl group of the ester group of the citrate is greater than 7, and a molecular weight is relatively large, the deterioration of plasticization efficiency may become serious, and defects of deteriorating properties such as stress resistance may be generated.

Meanwhile, like the hybrid or nonhybrid alkyl substituted citrate compound, trialkyl citrate, di-n-alkyl-m-alkyl citrate, etc. may be applied. If an acetyl group is present in the citrate-based material, it is apprehended that the physical properties of a plasticizer, particularly, processability and melting properties might be deteriorated according to the degradation of plasticization efficiency, mechanical properties such as elongation rate may be deteriorated, and economic feasibility may be deteriorated including cost increase due to the addition of a preparation process and treatment equipment by the generation of waste acetic acid and the increase of the amount used by inferior efficiency.

In other words, in case where the citrate-based material is an acetyl citrate compound in which the hydrogen of a remaining hydroxyl group other than three ester groups is substituted with an acetyl group, various aspects including marketability, economic feasibility, physical properties, etc. may be deteriorated due to the degradation of plasticization efficiency, the injection of an increased amount of a plasticizer to overcome the defect, and product cost increase thereby.

According to an embodiment of the present disclosure, the citrate-based material represented by Formula 1 may be prepared through a direct esterification reaction. In this case, with respect to 1 mol of citric acid or derivatives thereof, the alcohol may be used in 3 to 10 mol, 3 to 8 mol, 3 to 6 mol, or 3 to 5 mol, and among them, 3 to 5 mol may preferably be used.

The direct esterification reaction may be performed in the presence of a catalyst, and the catalyst may be one or more selected from the group consisting of inorganic acids, organic acids and Lewis acids, and may be one or more selected from the group consisting of organic acids and Lewis acids.

The inorganic acid may be one or more selected from the group consisting of sulfuric acid, hydrochloric acid and phosphoric acid.

The organic acid may be one or more selected from the group consisting of p-toluenesulfonic acid, methanesulfonic acid, ethanesulfonic acid, propanesulfonic acid, butanesulfonic acid and alkyl sulfuric acid.

The Lewis acid may be one or more selected from the group consisting of aluminum derivatives (aluminum oxide, aluminum hydroxide), tin derivatives (tin fatty acid ester of $C_3$ to $C_{12}$, tin oxide, tin hydroxide), titanium derivatives (tetraalkyl titanate of $C_3$ to $C_8$, titanium oxide, titanium hydroxide), lead derivatives (lead oxide, lead hydroxide) and zinc derivatives (zinc oxide, zinc hydroxide).

If the catalyst is a homogeneous catalyst, the catalyst may be used in 0.001 to 5 parts by weight or 0.001 to 3 parts by weight, preferably, 0.01 to 3 parts by weight with respect to 100 parts by weight of the sum of the citric acid or derivatives thereof with the alcohol.

If the catalyst is a heterogeneous catalyst, the catalyst may be used in 0.5 to 200 parts by weight or 0.5 to 100 parts by weight, preferably, 0.5 to 200 parts by weight with respect to 100 parts by weight of the sum of the citric acid or derivatives thereof with the alcohol.

The direct esterification reaction may be performed at 100 to 280° C., 130 to 250° C. or 150 to 230° C., preferably, 150 to 230° C.

The direct esterification reaction may be performed for 3 to 30 hours or 3 to 25 hours, preferably, 3 to 25 hours.

Meanwhile, the citrate-based material may be prepared by trans esterification reaction, and in this case, by the trans esterification reaction of a citric acid derivative with an alcohol. This case may be applied for the preparation of hybrid citrate.

The plasticizer composition according to an embodiment of the present invention is characterized in mixing and using an epoxidized oil with the citrate-based material. The epoxidized oil may comprise epoxidized soybean oil, epoxidized castor oil, epoxidized linseed oil, epoxidized palm oil and epoxidized tall oil.

Meanwhile, the citrate-based material has excellent plasticization efficiency and mechanical properties when compared with a terephthalate-based material, but has defects having inferior heat resistance properties to such an extent to hardly utilize the excellent properties. Such inferior physical properties are difficult to supplement, and the citrate-based material may be a material hard to produce a product as a plasticizer meeting the requirements of the real market.

In order to compensate such inferior physical properties, trials to increase the carbon number of the citrate-based material or applying an excessive amount of an epoxidized oil for counterbalancing were conducted, but despite the trials, the improvement of heat resistance properties was difficult, and rather, there are problems in that plasticization efficiency and mechanical properties are deteriorated on the contrary.

In addition, even though tributyl citrate or acetyl tributyl citrate is widely used as the citrate-based material, they have bad effect on various physical properties due to substantially high volatility.

In order to compensate the above-described defects, the present disclosure is characterized in applying a citrate prepared by applying alkyl group of 5 to 7 carbon atoms, i.e., an alcohol of 5 to 7 carbon atoms, to a citrate-based material, and is characterized in controlling a mixing ratio with an epoxidized oil such that the amount of the epoxidized oil is 50 wt % or less with respect to the mixing weight of two components.

In case of mixing the citrate-based material with the epoxidized oil, by applying the citrate-based material with a restricted carbon number to a suitable level, mechanical properties may be stably improved, and the improvement of stress resistance and migration properties may be secured. In addition, by mixing the epoxidized oil in a restricted ratio, the securing of heat resistance and the improvement of overall physical properties as well as mechanical properties may be stably achieved.

According to an embodiment of the presentdisclosure, the citrate-based material and the epoxidized oil are included in a weight ratio of 90:10 to 50:50. The weight ratio may be, for example, as an upper limit, 90:10, 85:15, or 80:20, may be 75:25, or 70:30, as a lower limit, 50:50, preferably, 55:45 or 60:40. However, to maximize the above-described effects, a weight ratio of 90:10 to 55:45, preferably, a weight ratio of 85:15 to 60:40 may be applied.

As in the presentdisclosure, when the citrate-based material and the epoxidized oil are used in a mixture, excellent physical properties of each material may be maintained, while synergistic effects of improving inferior physical properties may be provided. Particularly, while the improvement of mechanical properties such as tensile strength and elongation rate may besubstantial, the excellent plasticization efficiency may be maintained, migration properties and volatile loss may also be substantially improved, and excellent effects on the improvement of stress resistance may be anticipated.

The resin composition according to another embodiment of the present disclosure includes 100 parts by weight of a resin, and 5 to 150 parts by weight of the aforementioned plasticizer composition. The plasticizer composition may be included in 5 to 150 parts by weight, preferably, 5 to 130 parts by weight, or 10 to 120 parts by weight based on 100 parts by weight of the resin.

Common resins well-known in the field may be used as the above-said resin. For example, one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, natural rubber, synthetic rubber and thermoplastic elastomer may be used without limitation.

Generally, the resin using the plasticizer composition therewith may be prepared into a resin product through a melt processing or a plastisol processing, and a resin by the melt processing and a resin from the plastisol processing may be produced differently according to each different polymerization method.

For example, in case of using a vinyl chloride polymer in a melt processing, solid phase resin particles having a large average particle diameter prepared by suspension polymerization or the like are used, and thus prepared vinyl chloride polymer is referred to as a straight vinyl chloride polymer. In case of using a vinyl chloride polymer in a plastisol processing, a sol state resin as minute resin particles prepared by emulsion polymerization or the like is used, and this vinyl chloride polymer is referred to as a paste vinyl chloride resin.

Here, in case of the straight vinyl chloride polymer, a plasticizer may preferably be included in a range of 5 to 80 parts by weight with respect to 100 parts by weight of the polymer, and in case of the paste vinyl chloride polymer, the plasticizer may be included in a range of 40 to 120 parts by weight with respect to 100 parts by weight of the polymer.

The resin composition may further include a filler. The filler may be 0 to 300 parts by weight, preferably, 50 to 200 parts by weight, more preferably, 100 to 200 parts by weight based on 100 parts by weight of the resin.

The plasticizer composition according to an embodiment of the present disclosure may preferably be applied to a straight vinyl chloride polymer, and accordingly may be melt processed, and may be used as a plasticizer in resin products applied for the processing of calendaring, extrusion, injection, etc., which are processing methods explained later.

A filler well-known in the field may be used as the above-said filler, which is not specifically limited. For example, the filler may be one or more selected from silica, magnesium carbonate, calcium carbonate, hard coal, talc, magnesium hydroxide, titanium dioxide, magnesium oxide, calcium hydroxide, aluminum hydroxide, aluminum silicate, magnesium silicate and barium sulfate.

In addition, the resin composition may further include other additives such as a stabilizer as necessary. Each of the other additives such as the stabilizer may be included in an amount of, for example, 0 to 20 parts by weight, preferably 1 to 15 parts by weight, based on 100 parts by weight of the resin.

As the above-said stabilizer, for example, a calcium-zinc-based (Ca—Zn-based) stabilizer such as a composite stearate of calcium-zinc or a barium-zinc-based (Ba—Zn-based) stabilizer using barium-zinc as main metal materials may be used, but not specifically limited.

The resin composition may be applied to both a melt processing and a plastisol processing as described above. A calendaring processing, an extrusion processing, or an injection processing may be applied to the melt processing, and a coating processing or the like may be applied to the plastisol processing.

The resin composition may be used for manufacture of wires, flooring materials, automobile interior materials, films, sheets or tubes.

Hereinafter, embodiments of the present disclosure are explained in detail so that a person skilled in the art may easily perform. The present disclosure may, however, be embodied in different forms and should not be construed as limited to the embodiments set forth herein.

Preparation Example 1: Preparation of TnPC

Tri(n-pentyl) citrate (TnPC) was finally obtained (792 g, yield 98%) using 384 g of citric acid and 780 g of n-pentanol as reaction materials.

Preparation Example 2: Preparation of TnHxC

Tri(n-hexyl) citrate (TnHxC) was finally obtained (871 g, yield 98%) using 384 g of citric acid and 918 g of n-hexanol as reaction materials.

Preparation Example 3: Preparation of TnHpC

Tri(n-heptyl) citrate (TnHpC) was finally obtained (954 g, yield 98%) using 384 g of citric acid and 1,044 g of n-heptanol as reaction materials.

Preparation Example 4: Preparation of ATnHpC

Acetyl tri(n-heptyl) citrate (ATnHpC) was obtained (1,062 g) by performing acetylation reaction of 1,000 g of tri(n-heptyl) citrate (TnHpC) of Preparation Example 3 with 230 g of acetic anhydride and 3 g of methansulfonic acid at 120° C. for 3 hours.

Preparation Example 5: Preparation of eFAEHE

Into a four-neck, 3-liter reactor equipped with a cooler, a condenser, a decanter, a reflux pump, a temperature controller and a stirrer, 1,000 g of epoxidized soybean oil (ESO), 500 g of 2-ethylhexanol, and 5.5 g of a metal salt catalyst were injected, and the temperature was slowly elevated to about 180° C.

The reaction was terminated after confirming complete reaction and consumption of ESO through gas chromatography analysis. After finishing the reaction, the product was separated, and 1,210 g of an epoxidized fatty acid 2-ethylhexyl ester composition was finally obtained.

Examples and Comparative Examples

Plasticizer compositions of Examples and Comparative Examples were prepared using the materials prepared in the Preparation Examples, and the materials and contents are summarized in Table 1 below. The evaluation of the physical properties of the plasticizer compositions were performed according to the experimental items described below. Materials other than the materials prepared in the Preparation Examples used were commercial products.

TABLE 1

| | Citrate-based material | Epoxidized oil | Others |
|---|---|---|---|
| Example 1 | TnPC 90 | ESO[2] 10 | |
| Example 2 | TnPC 80 | ESO 20 | |
| Example 3 | TnPC 60 | ESO 40 | |
| Example 4 | TnHxC 90 | ESO 10 | |
| Example 5 | TnHxC 80 | ESO 20 | |
| Example 6 | TnHxC 70 | ESO 30 | |
| Example 7 | TnHxC 60 | ESO 40 | |
| Example 8 | TnHxC 50 | ESO 50 | |
| Example 9 | TnHpC 90 | ESO 10 | |
| Example 10 | TnHpC 80 | ESO 20 | |
| Example 11 | TnHpC 60 | ESO 40 | |
| Example 12 | TnHxC 70 | ELO 30 | |
| Comparative Example 1 | — | — | DEHTP[3] |
| Comparative Example 2 | TnPC 95 | ESO 5 | |
| Comparative Example 3 | TnHpC 30 | ESO 70 | |
| Comparative Example 4 | TnHxC 30 | ESO 70 | |
| Comparative Example 5 | TBC[4] 70 | ESO 30 | |
| Comparative Example 6 | TBC 50 | ESO 50 | |
| Comparative Example 7 | TBC 40 | ESO 60 | |
| Comparative Example 8 | TEHC[5] 70 | ESO 30 | |
| Comparative Example 9 | TEHC 30 | ESO 70 | |
| Comparative Example 10 | TINC[6] 50 | ESO 50 | |
| Comparative Example 11 | ATnHpC 60 | ESO 40 | |
| Comparative Example 12 | TnPC 70 | | eFAEHE 30 |
| Comparative Example 13 | TBC 100 | | |
| Comparative Example 14 | | ESO 100 | |

1) The contents in Table 1 are all wt %.
2) ESO: epoxidized soybean oil (Sajo Haepyo Co., Ltd.)
3) DEHTP: di(2-ethylhexyl) terephthalate (LG Chem, Co., Ltd.)
4) TBC: tributyl citrate (LG Chem, Co., Ltd.)
5) TEHC: tri(2-ethylhexyl) citrate (LG Chem, Co., Ltd.)
6) TINC: triisononyl citrate (LG Chem, Co., Ltd.)

Experimental Example 1: Performance Evaluation

By using the plasticizers of the Examples and the Comparative Examples, specimens were prepared according to ASTM D638 and the prescription and preparation conditions below.

(1) Prescription: 100 parts by weight of a straight vinyl chloride polymer (LS100S, LG Chem,), 40 parts by weight of a plasticizer and 3 parts by weight of a stabilizer (BZ-153T)

(2) Mixing: mixing at 98° C. in 700 rpm (3) Preparation of specimen: 1T, 2T and 3T sheets were manufactured by processing at 160° C. for 4 minutes by a roll mill, and at 180° C. for 2.5 minutes (low pressure) and 2 minutes (high pressure) by a press (4) Test items 1) Hardness: Shore hardness (Shore "A" and "D") at 25° C. was measured using a 3T specimen for 10 seconds using ASTM D2240. The plasticization efficiency was assessed excellent if the value was small.

2) Tensile strength: By an ASTM D638 method, a specimen was drawn in a cross-head speed of 200 mm/min using a test apparatus of U.T.M (manufacturer: Instron, model name: 4466), and a point where the 1T specimen was cut was measured. The tensile strength was calculated as follows.

Tensile strength $(kgf/cm^2)$ = load value (kgf)/(thickness (cm)×width (cm))

3) Elongation rate: By an ASTM D638 method, a specimen was drawn in a cross-head speed of 200 mm/min using a test apparatus of U.T.M, and a point where the 1T specimen was cut was measured. The elongation rate was calculated as follows.

Elongation rate (%) (length after elongation/initial length)×100

4) Migration loss measurement: According to KSM-3156, a specimen with a thickness of 1 mm was obtained, glass plates were attached onto both sides of the specimen, and a load of 1 $kgf/cm^2$ was applied. The specimen was stood in a hot air circulation type oven (80° C.) for 72 hours and then taken out and cooled at room temperature for 4 hours. Then, the weights of the specimen from which glass plates attached onto both sides thereof were removed, were measured before and after standing in the oven, and the migration loss was calculated as follows.

Migration loss (%)={(initial weight of specimen at room temperature−weight of specimen after standing in oven)/initial weight of specimen at room temperature}×100

5) Volatile loss: The specimen manufactured was processed at 80° C. for 72 hours, and the weight of the specimen was measured.

Volatile loss (wt %)={ (weight of initial specimen−weight of specimen after processing at 80° C. for 72 hours)/weight of initial specimen}×100

6) Stress test (stress resistance): A specimen with a thickness of 2 mm in a bent state was stood at 23° C. for 72 hours, and the degree of migration (degree of oozing) was observed. The results were recorded as numerical values, and excellent properties were shown if the quantity was closer to 0.

(5) Evaluation Results

The evaluation results on the test items are listed in Table 2 below.

lent effects on tensile strength, elongation rate, particularly, elongation rate as mechanical properties when compared with the plasticizers of Comparative Examples 1 to 14.

Particularly, the plasticizers of Examples 1 to 12 according to the present disclosure showed improved plasticization efficiency and excellent effects on migration loss and stress resistance when compared with an equal level conventional commercial product of Comparative Example 1.

In Comparative Examples 2 to 4, the effects according to the amounts of the epoxidized oil and the citrate-based material could be confirmed. When the amount of the citrate-based material was increased to 90 wt % or more and was used up to a level of 95%, mechanical properties (tensile strength and elongation rate) were further deteriorated when compared with the conventional product as in Comparative Example 2. In case of Comparative Examples 3 and 4 using the epoxidized oil in greater than 50 wt %, it was confirmed that stress resistance was deteriorated, and the width of fluctuation was large according to the change of the carbon number of the citrate-based material.

Also, in case of Comparative Example 5 using a citrate with a small carbon number, i.e., TBC, it was confirmed that the inferior mechanical properties were still shown, and

TABLE 2

| Division | Hardness Shore A | Hardness Shore D | Migration loss (%) | Volatile loss (%) | Tensile strength (kgf/cm$^2$) | Elongation rate (%) | Stress resistance |
|---|---|---|---|---|---|---|---|
| Example 1 | 90.5 | 46.0 | 0.75 | 0.88 | 238.4 | 317.6 | 0 |
| Example 2 | 92.1 | 46.5 | 0.88 | 0.98 | 240.0 | 314.2 | 0 |
| Example 3 | 91.7 | 46.2 | 0.61 | 0.77 | 245.4 | 339.7 | 0.5 |
| Example 4 | 91.5 | 46.2 | 1.00 | 0.90 | 238.5 | 320.0 | 0 |
| Example 5 | 92.0 | 46.4 | 0.98 | 0.87 | 237.9 | 324.0 | 0.5 |
| Example 6 | 92.2 | 46.7 | 0.84 | 0.74 | 240.2 | 320.5 | 0.5 |
| Example 7 | 92.3 | 46.8 | 0.65 | 0.58 | 251.6 | 332.0 | 0.5 |
| Example 8 | 92.4 | 46.7 | 0.50 | 0.47 | 248.9 | 329.5 | 0.5 |
| Example 9 | 93.6 | 47.7 | 2.66 | 0.76 | 238.1 | 325.9 | 1.0 |
| Example 10 | 93.4 | 47.4 | 2.66 | 0.68 | 238.1 | 325.9 | 1.0 |
| Example 11 | 92.8 | 47.0 | 1.02 | 0.43 | 234.8 | 318.9 | 0.5 |
| Example 12 | 92.0 | 46.5 | 0.80 | 0.70 | 256.3 | 324.1 | 0.5 |
| Comparative Example 1 | 94.6 | 49.9 | 3.94 | 0.86 | 236.5 | 314.0 | 3.0 |
| Comparative Example 2 | 90.3 | 45.7 | 2.54 | 3.89 | 201.3 | 300.5 | 0 |
| Comparative Example 3 | 94.7 | 48.9 | 0.71 | 0.23 | 221.4 | 320.6 | 2.5 |
| Comparative Example 4 | 94.2 | 48.1 | 0.52 | 0.59 | 208.4 | 287.8 | 2.5 |
| Comparative Example 5 | 91.5 | 46.0 | 0.65 | 4.57 | 214.5 | 302.8 | 0.5 |
| Comparative Example 6 | 92.8 | 47.2 | 1.80 | 2.03 | 221.0 | 290.5 | 2.0 |
| Comparative Example 7 | 93.1 | 47.5 | 1.84 | 1.65 | 238.1 | 288.2 | 2.0 |
| Comparative Example 8 | 95.6 | 49.7 | 3.04 | 0.38 | 220.5 | 290.6 | 3.0 |
| Comparative Example 9 | 96.8 | 52.3 | 0.89 | 0.32 | 204.7 | 268.7 | 2.0 |
| Comparative Example 10 | 95.4 | 49.5 | 3.56 | 0.32 | 232.0 | 284.6 | 3.0 |
| Comparative Example 11 | 95.3 | 49.4 | 3.12 | 0.45 | 208.6 | 295.6 | 2.5 |
| Comparative Example 12 | 89.7 | 43.8 | 1.77 | 1.94 | 224.2 | 309.2 | 0.5 |
| Comparative Example 13 | 89.4 | 43.5 | 1.02 | 8.67 | 202.0 | 256.4 | 0.5 |
| Comparative Example 14 | 96.4 | 52.5 | 0.48 | 0.23 | 230.4 | 280.5 | 2.0 |

Referring to Table 2, it could be confirmed that the plasticizers of Examples 1 to 12 showed significantly exceladditional deterioration of physical properties in volatile loss occurred. Here, in Comparative Examples 6 and 7 in which the amount of TBC was reduced, elongation rate and stress resistance were rather degraded, and plasticization efficiency was deteriorated.

In addition, in Comparative Examples 8 and 10, TEHC and TINC were applied as citrates having a large carbon number, and significant loss was confirmed on plasticization efficiency and migration resistance, and mechanical properties were poor without any improvement. In addition, stress resistance was also inferior to those of the Examples. In addition, in Comparative Example 9 in which the amount was reversed to improve Comparative Example 8, mechanical properties were deteriorated, and plasticization efficiency was further deteriorated, overshadowing improvement of the migration resistance.

Further, in Comparative Example 11 in which a citrate combined with an acetyl group was applied, overall physical properties were deteriorated except for volatile loss such that just one among the deteriorated physical properties could not be picked.

In addition, when an epoxidized alkyl monoester obtained by the esterification of an epoxidized oil as in Comparative Example 12 is used instead of an epoxidized oil, plasticization efficiency and volatile loss were improved to some degree when compared with Comparative Example 5, but the improvement of mechanical properties was still not shown. Considering the increase in product unit price due to the preparation through additional reaction, physical properties rather seemed to be deteriorated based on the same economic effects.

From the above results, it could be confirmed that the plasticizer compositions of embodiments according to the present disclosure may show remarkable improvement of mechanical properties and excellent improvement effects on stress resistance, migration properties and volatile loss, when the carbon number of the citrate-based material is controlled to 5 to 7, and when the weight ratio with an epoxidized oil is controlled so that the amount of the citrate-based material included is 50 wt % or more.

Finally, considering Comparative Examples 13 and 14 in which the citrate-based material and the epoxidized oil were solely used, respectively, it could be confirmed that each effect is not linearly changed according to the mixing ratio, but synergistic effects are generated by mixing.

The invention claimed is:
1. A plasticizer composition consisting of:
a citrate-based material in which alkyl groups of three ester groups are each independently selected from alkyl groups of 5 to 7 carbon atoms; and
an epoxidized oil,
wherein a weight ratio of the citrate-based material to the epoxidized oil is 90:10 to 50:50.
2. The plasticizer composition according to claim 1, wherein a weight ratio of the citrate-based material to the epoxidized oil is 90:10 to 55:45.
3. The plasticizer composition according to claim 1, wherein a weight ratio of the citrate-based material to the epoxidized oil is 85:15 to 55:45.
4. The plasticizer composition according to claim 1, wherein the alkyl groups of the three ester groups of the citrate-based material are each independently selected from the group consisting of a n-pentyl group, an isopentyl group, an n-hexyl group, an isohexyl group, an n-heptyl group and an isoheptyl group.
5. The plasticizer composition according to claim 1, wherein the citrate-based material is selected from the group consisting of tri(n-pentyl) citrate, triisopentyl citrate, tri(n-hexyl) citrate, triisohexyl citrate, tri(n-heptyl) citrate and triisoheptyl citrate.
6. The plasticizer composition according to claim 1, wherein the epoxidized oil comprises at least one selected from the group consisting of epoxidized soybean oil, epoxidized castor oil, epoxidized linseed oil, epoxidized palm oil and epoxidized tall oil.
7. The plasticizer composition according to claim 1, wherein the citrate-based material does not include an acetyl group.
8. A resin composition comprising:
100 parts by weight of a resin; and
5 to 150 parts by weight of the plasticizer composition according to claim 1 as a plasticizer.
9. The resin composition according to claim 8, wherein the resin is one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, natural rubber, synthetic rubber and thermoplastic elastomer.

* * * * *